United States Patent
Zhang et al.

(10) Patent No.: US 9,003,197 B2
(45) Date of Patent: Apr. 7, 2015

(54) METHODS, APPARATUS AND SYSTEM FOR AUTHENTICATING A PROGRAMMABLE HARDWARE DEVICE AND FOR AUTHENTICATING COMMANDS RECEIVED IN THE PROGRAMMABLE HARDWARE DEVICE FROM A SECURE PROCESSOR

(75) Inventors: Jiang Zhang, La Jolla, CA (US); Peter Chen, San Diego, CA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1704 days.

(21) Appl. No.: 12/056,721

(22) Filed: Mar. 27, 2008

(65) Prior Publication Data

US 2009/0249080 A1    Oct. 1, 2009

(51) Int. Cl.
| | |
|---|---|
| G06F 11/30 | (2006.01) |
| H04L 9/08 | (2006.01) |
| G06F 21/76 | (2013.01) |
| G06F 12/14 | (2006.01) |
| G06F 21/73 | (2013.01) |

(52) U.S. Cl.
CPC ............ *G06F 21/76* (2013.01); *G06F 12/1466* (2013.01); *G06F 21/73* (2013.01); *G06F 2221/2129* (2013.01)

(58) Field of Classification Search
CPC ...................... G06F 2221/0779; G06F 12/1466
USPC .......... 713/187, 188, 186, 185, 189; 380/228, 380/229, 223, 278
See application file for complete search history.

(56) References Cited

U.S. PATENT DOCUMENTS

| | | | | |
|---|---|---|---|---|
| 5,623,637 | A * | 4/1997 | Jones et al. | 711/164 |
| 5,742,682 | A * | 4/1998 | Baker et al. | 380/277 |
| 5,784,463 | A * | 7/1998 | Chen et al. | 713/171 |
| 7,848,522 | B2 * | 12/2010 | Haverinen | 380/247 |
| 7,894,603 | B2 * | 2/2011 | Senshu | 380/200 |
| 7,974,234 | B2 * | 7/2011 | Gustave et al. | 370/328 |
| 2001/0029579 | A1* | 10/2001 | Kusakabe et al. | 713/172 |
| 2004/0073792 | A1 | 4/2004 | Noble et al. | |
| 2005/0033705 | A1* | 2/2005 | Walmsley et al. | 705/67 |
| 2005/0066168 | A1* | 3/2005 | Walmsley | 713/169 |
| 2005/0195975 | A1* | 9/2005 | Kawakita | 380/30 |

(Continued)

OTHER PUBLICATIONS

PCT Search Report & Written Opinion, RE: Application #PCT/US09/37612 May 13, 2009.

*Primary Examiner* — Abu Sholeman
(74) *Attorney, Agent, or Firm* — Thomas A. Ward (57) ABSTRACT

A method, device and system for authenticating a programmable hardware device, such as a programmable hardware chip, and a command received by the programmable hardware device. A secure processor or other trusted source authenticates the programmable hardware chip by verifying, with the secure processor's own verification key, a random number sent to the programmable hardware chip and encrypted using a verification key embedded within the programmable hardware chip, since the nature of the encryption is such that only the original logic function that includes the verification key can encrypt the data correctly. A command received by the programmable hardware chip is authenticated by verifying that a command authentication token received by the programmable hardware chip is generated using the correct command authentication key and consequently verifying that the command is received from the secure processor, as only the party who has the command authentication key can encrypt the data correctly.

8 Claims, 6 Drawing Sheets

(56) References Cited

U.S. PATENT DOCUMENTS

| | | | | |
|---|---|---|---|---|
| 2006/0050877 | A1* | 3/2006 | Nakamura | 380/46 |
| 2006/0075259 | A1* | 4/2006 | Bajikar et al. | 713/189 |
| 2006/0087999 | A1* | 4/2006 | Gustave et al. | 370/328 |
| 2006/0172723 | A1* | 8/2006 | Ishikawa | 455/411 |
| 2006/0206727 | A1* | 9/2006 | Wasson et al. | 713/189 |
| 2007/0011023 | A1 | 1/2007 | Silverbrook | |
| 2007/0104054 | A1* | 5/2007 | Senshu | 369/47.12 |
| 2007/0116292 | A1* | 5/2007 | Kurita et al. | 380/270 |
| 2007/0143623 | A1* | 6/2007 | Walmsley et al. | 713/176 |
| 2007/0192828 | A1* | 8/2007 | Messina et al. | 726/2 |
| 2007/0226498 | A1 | 9/2007 | Walmsley et al. | |
| 2007/0234068 | A1* | 10/2007 | Silverbrook et al. | 713/189 |
| 2008/0109371 | A1* | 5/2008 | Sakamura et al. | 705/67 |
| 2008/0189547 | A1* | 8/2008 | Sugiyama | 713/169 |
| 2008/0263367 | A1* | 10/2008 | Tatebayashi et al. | 713/193 |
| 2009/0013178 | A9* | 1/2009 | Silverbrook | 713/161 |
| 2009/0063865 | A1* | 3/2009 | Berenbaum et al. | 713/180 |
| 2009/0164800 | A1* | 6/2009 | Johansson et al. | 713/189 |
| 2010/0174907 | A1* | 7/2010 | Semple et al. | 713/169 |
| 2010/0268946 | A1* | 10/2010 | Taylor | 713/168 |

* cited by examiner

METHODS, APPARATUS AND SYSTEM FOR AUTHENTICATING A PROGRAMMABLE HARDWARE DEVICE AND FOR AUTHENTICATING COMMANDS RECEIVED IN THE PROGRAMMABLE HARDWARE DEVICE FROM A SECURE PROCESSOR

BACKGROUND OF THE INVENTION

1. Field of the Invention

The invention relates to the programmable hardware integrated circuit (IC) devices, commonly referred to as programmable hardware chips. More particularly, the invention relates to a system having a secure processor that authenticates a programmable hardware device of the system and that uses the programmable hardware device to authenticate commands received in the programmable hardware device from the secure processor.

2. Description of the Related Art

A programmable hardware chip is an IC that comprises digital logic circuits that can be programmed, or configured, into different configurations that perform different functions. Examples of programmable hardware chips include programmable logic arrays (PLAs), field programmable gate arrays (FPGAs), complex programmable logic devices (CPLDs), application specific integrated circuits (ASICs), etc. Programmable hardware chips are widely used in many applications and in many different host devices, including, for example, communication devices such as set-top boxes (STBs) and other multimedia processing devices.

Typically, programmable hardware chips are not protected by a password or cryptographic keys. Thus, a programmable hardware chip typically can be programmed and re-programmed to configure and re-configure the logic circuits embedded in them to perform different logic functions. If the programmable hardware chip is used for security functions, some mechanism is needed to provide the chip with the ability to prevent an unauthorized user from modifying the logic circuits.

For example, in content rendering devices, such as STBs and wireless devices with rendering capability, for example, certain types of content is typically protected so that only authorized users and authorized devices are allowed to play back the content. In these types of environments, a secure processor (SP) operates in conjunction with a host processor to perform authentication to prevent unauthorized access to the content. The SP and the host processor are typically microprocessors that generally cannot be reconfigured or reprogrammed by any unauthorized party after their initial programming. The programmable hardware devices generally are not able to be involved in the cryptographic authentication process. The primary reason for this is that programmable hardware devices generally do not have a sufficient number of logic gates to enable them to implement useful cryptographic algorithms. However, in many security-related applications, it is desirable or necessary to ensure that the programmable hardware device has not been reprogrammed or reconfigured in a way that compromises the security of the system.

As stated above, in many cases it is possible to erase and reprogram or reconfigure the logic circuits of a programmable hardware device to enable it to perform functions that were not part of the original programming of the hardware device. In some cases, reprogramming of the programmable hardware device may make it possible to overcome the security of the system provided by the SP and the host processor of the system.

Accordingly, a need exists for a method, apparatus and system for determining whether programmable hardware device has been reprogrammed, reconfigured, erased, or otherwise altered.

In addition, while the initial programming of the SP generally cannot be reprogrammed by an unauthorized party after the system has been installed in a product device and shipped to the customer, it may be possible for an unauthorized person to "spoof" a command that is sent to the programmable hardware device, i.e., to trick the programmable hardware device into accepting a command that did not originate in the SP as if the command did originate in the SP. As stated above, programmable hardware devices generally do not have a sufficient number of logic gates to enable them to implement useful encryption/decryption algorithms. In the absence of encryption/decryption algorithms being employed to encrypt/decrypt commands passing from the SP to the programmable hardware device, the likelihood that a spoofing attempt would be successful increases.

Accordingly, a need exists for a method, apparatus and system for determining whether a command received in a programmable hardware device is a valid command.

DETAILED DESCRIPTION

In the following description, like reference numerals indicate like components to enhance the understanding of the programmable hardware chip authenticating methods, devices and systems through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

Figure 1:
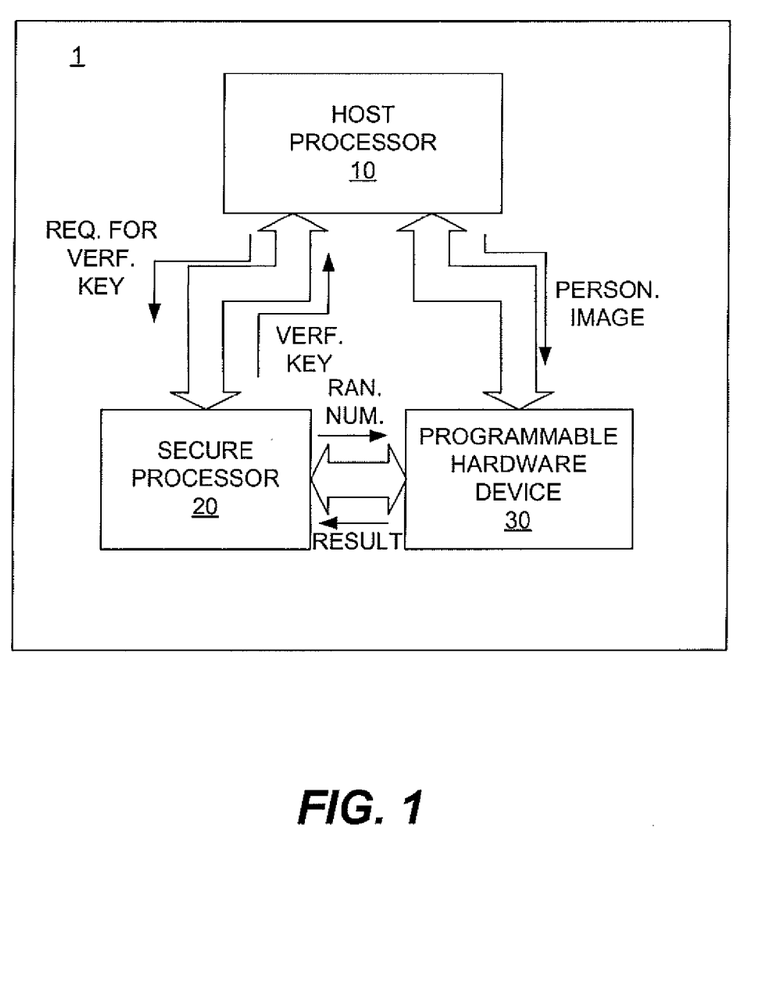
FIG. 1 illustrates a block diagram of the system in accordance with an embodiment for authenticating a programmable hardware device, wherein the system includes a host processor, a secure processor (SP) and the programmable hardware device to be authenticated.

FIG. 1 illustrates a block diagram of the system 1 in accordance with an embodiment. In accordance with this embodiment, the system 1 includes a host processor 10, a secure processor (SP) 20 and a programmable hardware device 30, which may be, for example, a PLA, an FPGA, a CPLD, an ASIC, etc. For purposes of the describing the principles and concepts of the invention, it will be assumed that programmable hardware device 30 is a CPLD. Therefore, the programmable hardware device 30 will be referred to herein interchangeably as the programmable hardware device 30 or the CPLD 30. The host processor 10 and the programmable hardware device 30 each typically have a central processing unit (CPU) and one or more memory elements, such as for example, a random access memory (RAM) element, an electrically erasable programmable read only memory (EEPROM) element, a flash memory element, etc. These memory elements are typically used to store computer instructions and/or data for execution by the CPU and/or by another processing unit of the processor.

In the factory, prior to shipment to the customer, the host processor 10 and the SP 20 communicate messages between them during which the host processor 10 requests a verification key from the SP 20. The host processor 10 executes special computer code during this time that will be deleted prior to shipping the system 1 to the customer. In response to the request for the verification key, the SP 20 generates a random number that is output and sent to the host processor 10. This random number serves as a verification key. The SP 20 stores this random number as the verification key in a memory device located inside of the SP 20.

The host processor 10 receives the verification key and uses the verification key to modify, or personalize, a programming image that is to be used to program the CPLD 30. The process of using the verification key to generate the programming image may be thought of as personalizing the image that will be used to program the programmable hardware device 30. This personalized image actually personalizes the logical circuit design for this specific verification key. The host processor 10 then programs the CPLD 30 with the programming image. The host processor 10 does not retain a copy of the verification key. The personalized programming image is essentially a programming configuration for the CPLD 30 that configures the digital logic circuits of the CPLD 30 with a particular logical configuration. By using the verification key in the process of generating, or personalizing, the programming image, the verification key essentially becomes "hidden" in the logical configuration of the CPLD 30. After this point in time, the verification key will never be exchanged between any of the host processor 10, the SP 20 and/or the CPLD 30.

Figure 2:
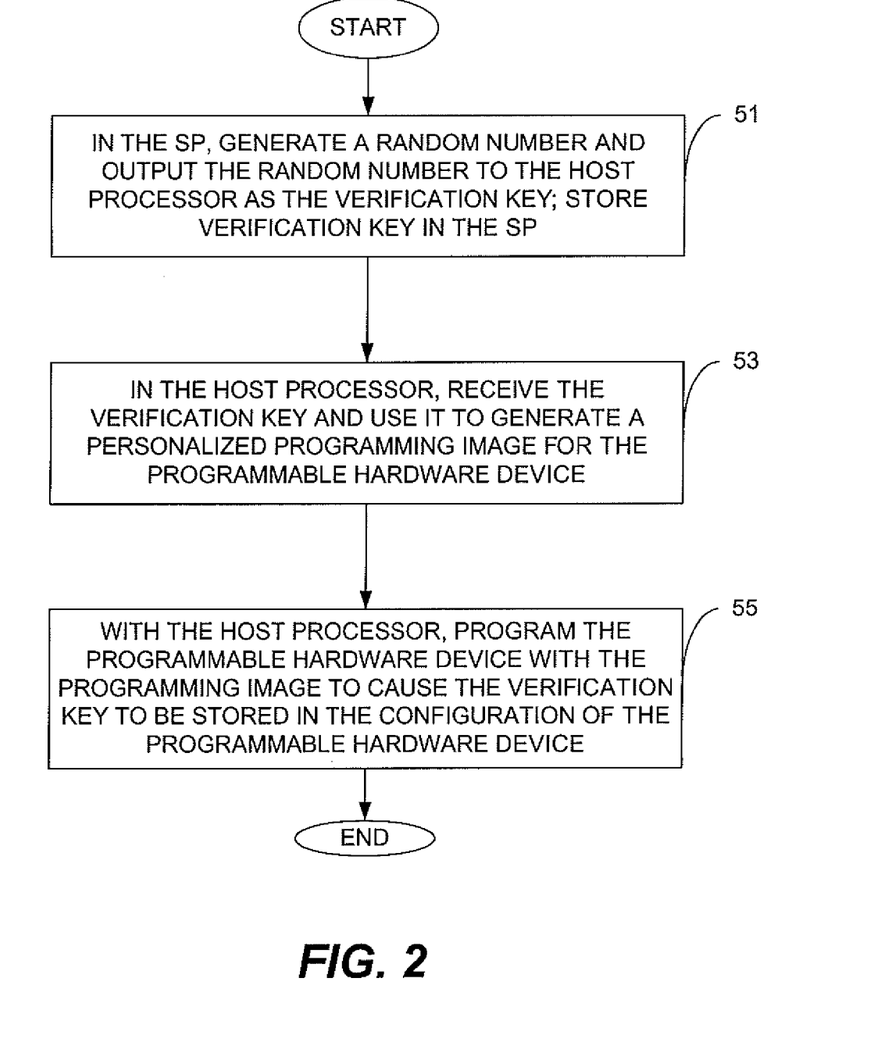
FIG. 2 illustrates a flowchart that represents a method performed by the system shown in FIG. 1 to personalize a programming image with a randomly generated verification key and to configure the programmable hardware device shown in FIG. 1 with the personalized programming image.

FIG. 2 illustrates a flowchart that represents the method in accordance with an embodiment performed in the factory to program the verification key into the programmable hardware device 30. The SP 20 generates a random number that is output to the host processor 10 and saved in a memory element inside of the SP 20, as indicated by block 51. As indicated above, this random number serves as a verification key. The host processor 10 receives the verification key and uses the verification key to generate a personalized programming image for the programmable hardware device 20, as indicated by block 53. Prior to receiving the verification key in the host processor 20, the host processor 20 typically has been preprogrammed to configure the programmable hardware device 30 with a programming image. The process of using the verification key to generate the programming image represented by block 53 generally entails modifying the programming image that has already been generated in the host processor 10 in accordance with the verification key to generate a programming image in which the verification key is embedded.

After the personalized programming image has been generated, the host processor 10 programs the programmable hardware device 30 by configuring the logical circuits of the programmable hardware device 30 in accordance with the programming image, as indicated by block 55. The process represented by block 55 is generally the typical process that is used to program programmable hardware devices such as a CLPD, for example. Therefore, in the interest of brevity and because this process is known by persons skilled in the art, this process will not be described herein in further detail.

Because the verification key is now part of the configuration of the programmable hardware device 30, the verification key is essentially stored in the configuration of the programmable hardware device 30. Different images will produce different results when embedding the verification key in the configurable hardware device 30. Thus, by using a different verification key and thus a different personalized image in the factory when programming each programmable hardware device for each system, the image of the programmable hardware device is obfuscated for each product unit. Furthermore, because the verification key is never exchanged between the host processor 10, the SP 20 and/or the programmable hardware device 30 after the product unit containing the system 1 leaves the factory, and because the host processor 10 does not save a copy of the verification key, it is virtually impossible for anyone to be able to ascertain the verification key.

After the system 1 has been shipped to the customer, the SP 20 will perform a verification process to determine whether the CLPD 30 has been reprogrammed, erased, altered, etc. Preferably, the verification process is performed each time the system 1 boots up, although it may be performed periodically one or more additional times after boot up. To perform the verification process, the SP 20 generates a random number, which is then output from the SP 20 and sent to the CLPD 30. The SP 20 saves a copy of the random number as the verification key in a memory element inside of the SP 20. The CLPD 30 then performs an algorithm that processes the random number it receives and outputs a result, which is then sent to the SP 20. The SP 20 also performs an algorithm in firmware that is the same as the algorithm performed in hardware in the CLPD 30. If the SP 20 has enough secure memory to store a lookup table (LUT), the SP 20 can generate a personalized pre-computed LUT based on the operations defined by the verification key to speed up the logical operations. In this case, the SP 20 can look up entries in one or more lookup tables using the random number sent to the CLPD 30 to quickly obtain the result. This enables the SP 20 to instantly obtain the result without having to perform all of the logical operation performed in hardware inside of the CLPD 20.

The result that the SP 20 obtains should be the same as the result received in the SP 20 from the CLPD 30. However, if the logical configuration of the CLPD 30 has been reprogrammed, erased, or otherwise tampered with, the results will not be the same. The SP 20 compares the result it produces with the result it receives from the CLPD 30, and if the results do not match, the SP 20 determines that the CLPD 30 cannot be trusted. The SP 20 may then output an indication to the host processor 10 that informs the host processor 10 that the CLPD 30 cannot be trusted. Also, the SP 20 preferably will stop working until it reboots. As the SP 20 holds secret keys that the host processor 10 and the entire system 1 need in order to continue operating, the entire system 1 will stop working until the SP 20 reboots. When the SP 20 reboots, the CPLD 30 validation process will again be re-started and performed.

Figure 3:
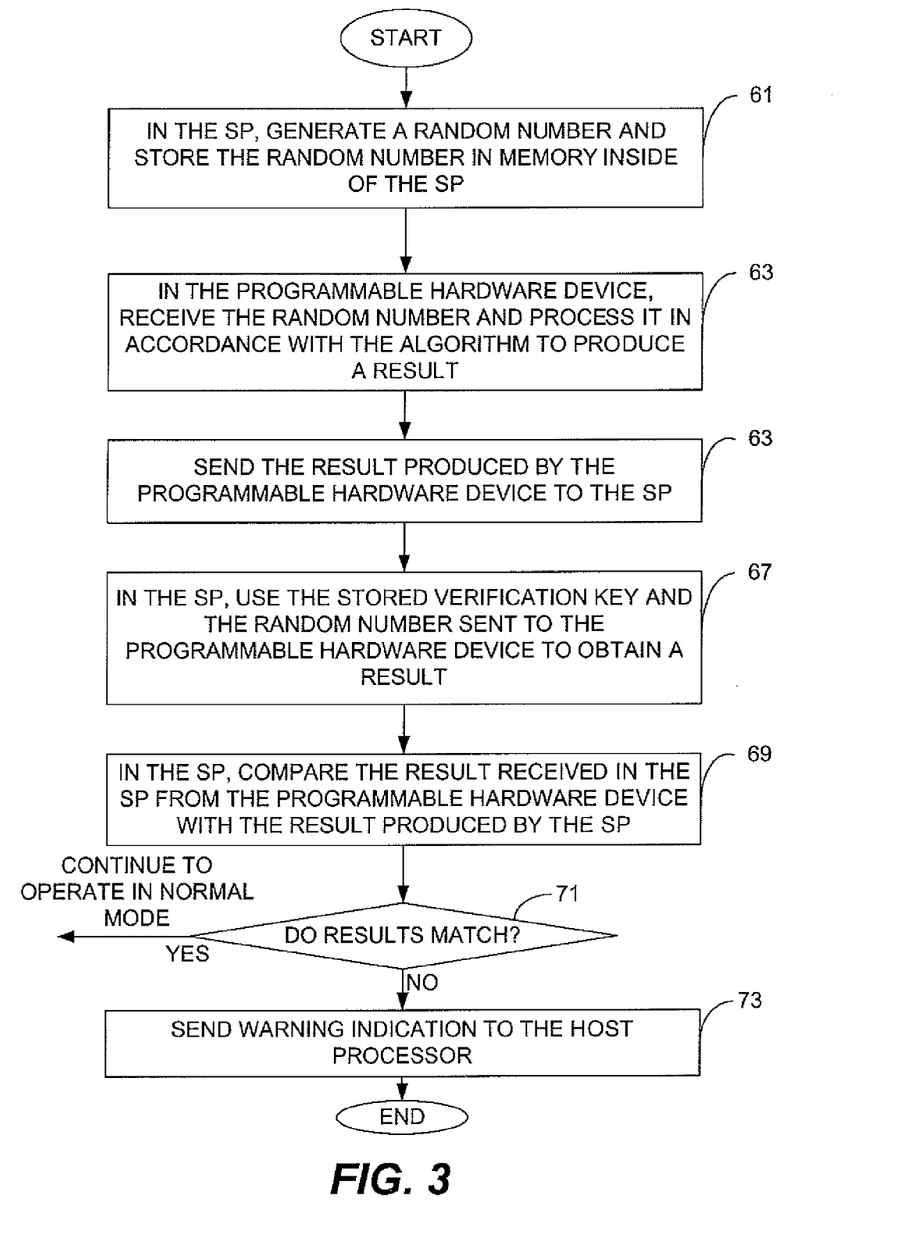
FIG. 3 illustrates a flowchart that represents a method performed by the system shown in FIG. 1 after the method represented by the flowchart shown in FIG. 2 has been performed to authenticate the programmable hardware device.

FIG. 3 illustrates a flowchart that represents the method in accordance with an embodiment for performing the verification process described above after the system 1 has been shipped to the customer. The verification process starts when the system 1 boots up. At the start of the process, the SP 20 generates a random number and stores it in memory inside of the SP 20, as indicated by block 61. The SP 20 then forwards the random number to the CLPD 30, which receives the random number and processes it in accordance with an algorithm to obtain a result, as indicated by block 63. An example of a suitable algorithm performed by the CLPD 30 for this purpose will be described below in detail. The CLPD 30 then forwards the result to the SP 20, as indicated by block 65.

Preferably, while the CLPD 30 is performing this algorithm in hardware, the SP 20 is performing its algorithm in firmware. By the time that the SP 20 receives the result from the CLPD 30, the SP 20 may have already generated its own result, as indicated by block 67. It is possible that the CLPD 30 will obtain its result before the SP 20 obtains its result, and vice versa. Once the SP 20 has received the result from the CLPD 30 and has obtained its own result, the SP 20 compares the results, as indicated by block 69. The SP then determines based on the comparison whether the results match, as indicated by block 71. If the results match, then the system 1 continues to operate in the normal manner. If the results do not match, preferably the SP 20 sends a warning notification to the host processor 10, as indicated by block 73, and preferably stops functioning.

As stated above, the SP 20 holds the secret keys that the host processor 10 needs in order to continue to function. Therefore, the entire system 1 will stop functioning in the event that the SP 20 stops functioning. In this case, the host processor 10 may then take some appropriate action, such as, for example, disabling the system 1 and/or send a warning indication to a monitoring device (not shown) external to the system 1. For example, in the case where the system is an STB employed in a cable television network, the host processor 1 may cause a notification to be sent to equipment at the head-end that informs a person charged with monitoring the network that the programmable hardware device in the corresponding STB at the corresponding customer premises has been compromised.

Having described the functionality associated with the algorithms that are performed in the system 1 in the factory and after the product unit containing the system 1 has been shipped to the customer, an example of a suitable algorithm that may be performed by a CLPD implemented as the configurable hardware device 30 will now be provided. The following acronyms will be used in describing the algorithm:
CMK CPLD Mating Key
CPLD Complex Programmable Logic Device
FPGA Field Programmable Gate Array
SP Security Processor The verification key is referred to in the algorithm as CMK (CPLD Mating Key). Of course, the programmable hardware device 30 is not limited to a CPLD. Other programmable hardware devices including, but not limited to, PLAs and FPGAs are also suitable for this purpose. Any programmable hardware device that may be programmed with a programmed image that cannot be read out and re-programmed is suitable for this purpose.

In order to describe the algorithm, m-bit operation is assumed. In this example, the CMK is 4m bits in length. The CMK actually defines a specific logical operation for each bit. Because here CMK is chosen to be 4m bits, then for each bit, 16 (i.e. $2^4$) different operations may be defined. The values range from 0 to 15 and each value can be mapped to a specific logical bit operation. The CMK is not limited to 4m bits. If it is preferred that the CPLD 30 perform a smaller number of bit operations, the CMK may have a lesser number of bits (e.g. 3m bits). If it is preferred that the CPLD 30 will perform a greater number of bit operations, the CKM bit length may be longer (e.g. 5m bits).

With 4m bits being chosen for the CMK, the CMLD 30 will perform $2^4=16$ bit operations. Therefore, 4 bits are used to define each bit operation performed by each logic cell, or box, of the CMLD 30. The value of m is dependent upon how many logic cells are in the programmable hardware device. The greater the number of logic cells that are in the programmable hardware device, the higher the level of security that will be achieved. Normally, the value of m should not be less than 64. The core operation of the CMLD 30 may be defined as follows:

---

INPUT:
    ---- m-bit nonce N0.
OUTPUT:
    ---- m-bit Result R.
CONSTANTS:
    ---- 4m-bit CMK. It's obfuscated for each box, or logic cell of the CMLD 30;
    ---- Two (m x m)-bit matrixes A and B.

---

ALGORITHM (R=f(N0H, N0L), assuming m is an even number, and assuming that N0H is the most significant m/2 bits of N0 and N0L is the least significant m/2 bits):

(1) Derive the 4m-bit CMK into an m-byte array: consider the 4m-bit CMK as a bit string and divide it by every 4 bits and put the 4-bit numbers into the byte array CMKArray[m].

(2) Treat N0 as an m-bit integer. Set another m-bit integer Rn=N0;

$$(3) \text{ Let } A = \begin{pmatrix} a0,0 & a0,1 & \ldots & a0,m \\ a1,0 & a1,1 & \ldots & a1,m \\ & & \ldots & \\ am,0 & am,1 & \ldots & am,m \end{pmatrix}.$$

Here each $a_{i,j}$ entry in matrix A is one bit, and each row and each column of the matrix only contain a single "1" bit. The values of matrix A could also be obfuscated in factory. For example, the bits may be randomly re-ordered and personalized for each box, or logic cell, of the CMLD 30; each box could have (m!) values; if it becomes difficult to dynamically generate the circuits for each box, a value could be randomly picked from a set of pre-computed values.

$$(4) \text{ Let } B = \begin{pmatrix} b0, 0b0, 1 & \ldots & b0, m \\ b1, 0b1, 1 & \ldots & b1, m \\ & \ldots & \\ bm, 0bm, 1 & \ldots & bm, m \end{pmatrix}.$$

As with matrix A, matrix B may also be obfuscated in the factory in the manner described above with reference to the bits that make up matrix A.

The following is an example of the core algorithm executed by the CMLD 30 to process the randomly generated CMK received from the SP 20. In the following algorithm, "|" means Bitwise OR, "&" means Bitwise AND, "~" means bitwise NOT, "^" means bitwise XOR, and "||" means concatenation. The core algorithm is ((A×Rn)(B×Rn)), where "" is a bitwise operation that results in each bit operation of the CMLD 30 (i.e., the bits in the matrices A and B) being defined by the bits of the randomly generated CMK. As stated above, in this example, CMK is 4m bits, and so 16 bit operations are defined by the CMK. This core algorithm can be executed p rounds, where the value of p depends on the performance requirements. For example, if p=8 is selected, then the core algorithm is performed as follows:

```
(5)  For i = 1 to 8 {
         // Shuffle bits. Consider Rn as a column vector and each element
         of the vector as a bit.
         TA = A × Rn ;
         TB = B × Rn ;
         // Calculate Rn+1 = (A × Rn) ** (B × Rn)
         Rn+1 = 0;
         For j = 0 to m-1 {
             Switch(CMKArray[j])
             {
                 // start to handle each bit. The bit operation is specified
                 // by the CKM nibbles. Also, a subset of the
                 // operations could be implemented and CKM could be
                 made shorter.
                 Case 0:
                     T = 0;
                     Break;
                 Case 1:
                     T = TA & TB;
                     Break;
                 Case 2:
                     T = TA & ~TB;
                     Break;
                 Case 3:
                     T = TA;
                     Break;
                 Case 4:
                     T = ~TA & TB;
                     Break;
```

```
                 Case 5:
                     T = TB;
                     Break;
                 Case 6:
                     T = TA ^ TB;
                     Break;
                 Case 7:
                     T = TA | TB;
                     Break;
                 Case 8:
                     T = ~(TA | TB);
                     Break;
                 Case 9:
                     T = ~(TA ^ TB);
                     Break;
                 Case 10:
                     T = ~TB;
                     Break;
                 Case 11:
                     T = TA | ~TB;
                     Break;
                 Case 12:
                     T = ~TA;
                     Break;
                 Case 13:
                     T = ~TA | TB;
                     Break;
                 Case 14:
                     T = ~(TA & TB);
                     Break;
                 Case 15:
                     T = 1;
                     Break;
                 Default:
                     Return Error;
             }
             // only pick 1 bit add to Rn+1
             Rn+1 = Rn+1 | (T & (2^{m-1 -j}));
         } // finish handling each bit
         Rn = Rn+1;
     } // finish handling each round
(6)  Output Rn as R;
```

The result R is then sent to the SP 20, which compares the received result with the result obtained in SP 20 (e.g., from a pre-computed LUT in the SP 20) based on the values of the verification key stored in the SP 20 and on the value of the randomly generated nonce sent from the SP 20 to the CMLD 30.

The following is an example of another algorithm that may be used to compute the result, R, in the CMLD 30. Using $R=f(N_H, N_L)$ to express the core algorithm described above, the core algorithm may also be represented as:

$$R_H \| R_L = f(N_H, N_L),$$

where $R_H$ and $R_L$ represent the high and low m/2 bits, respectively, of the result R, and $N_H$ and $N_L$ represent the high and low m/2 bits of nonce N. The complete algorithm may be as follows:

```
INPUT:
---- 2m-bit Nonce, which is (N0 || N1), and N0 = (N0_H || N0_L), N1 = (N1_H || N1_L).
OUTPUT:
---- 2m-bit Result R = (R0 || R1), where R0 = (R0_H || R0_L), R1 = (R1_H || R1_L).
ALGORITHM:
(1)  T0 = f(N0_H, N0_L). Save T0_L. Same with the notes below, where Tx_H and Tx_L
     means the high and low m/2 bits of Tx respectively.
(2)  T1 = f(T0_H, N1_L). Save T1_H.
(3)  T2 = f(N1_H, T1_L). Export R0_H = T2_L.
(4)  Generate two m/2 bits constants C0 and C1. Set N2_L = T0_L ^ C0, N2_H = T1_H ^
     C1. Here the constants can be change to any arbitrary values;
(5)  T3 = f(T2_H, N2_L). Export R0_L = T3_H.
(6)  T4 = f(N2_H, T3_L). Export R1 = T4.
(7)  R = R0_H || R0_L || R1.
```

The result R is then sent to the SP 20, which compares the received result with the result obtained in SP 20 (e.g., from a pre-computed LUT in the SP 20) based on the values of the verification key stored in the SP 20 and on the value of the randomly generated nonce sent from the SP 20 to the CMLD 30.

The following is a simplified mathematical description of the first of the examples given above of a suitable core algorithm:

$$Rn+1 = (A \times Rn) **(B \times Rn),$$

$$\text{where } A = \begin{pmatrix} a0,0a0,1 & \ldots & a0,m \\ a1,0a1,1 & \ldots & a1,m \\ & \ldots & \\ am,0am,1 & \ldots & am,m \end{pmatrix}, \quad B = \begin{pmatrix} b0,0b0,1 & \ldots & b0,m \\ b1,0b1,1 & \ldots & b1,m \\ & \ldots & \\ bm,0bm,1 & \ldots & bm,m \end{pmatrix},$$

$$R_{n+1} = \begin{pmatrix} r0 \\ r1 \\ \ldots \\ r63 \end{pmatrix}, \quad R_n = \begin{pmatrix} q0 \\ q1 \\ \ldots \\ q63 \end{pmatrix},$$

$a_{i,j}$, $b_{i,j}$, $r_i$, $q_i$ each represents a bit; "×" means matrix multiplication, and "**" means a bitwise operation that is obfuscated by the 4-bit value of the randomly generated CMK:

TABLE 1

| 4-Bit CMK Value | Operation |
|---|---|
| 0 | =0 |
| 1 | a & b |
| 2 | a & ~b |
| 3 | A |
| 4 | ~a & b |
| 5 | B |
| 6 | a ^ b |
| 7 | a\|b |
| 8 | ~(a\|b) |
| 9 | ~(a ^ b) |
| 10 | ~b |
| 11 | a\|~b |
| 12 | ~a |
| 13 | ~a\|b |
| 14 | ~(a & b) |
| 15 | =1 |

The above mathematical operations can also be described as follows in the table below:

TABLE 2

| | | 4-Bit CMK Value | | | | | | | | | | | | | | | |
|---|---|---|---|---|---|---|---|---|---|---|---|---|---|---|---|---|---|
| a | b | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 1 | 1 | 1 | 1 | 1 | 1 | 1 | 1 |
| 0 | 1 | 0 | 0 | 0 | 0 | 1 | 1 | 1 | 1 | 0 | 0 | 0 | 0 | 1 | 1 | 1 | 1 |
| 1 | 0 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 |

For each 4-bit value extracted from the 4m-bit CMK, the corresponding bit values for bit value a and bit value b are given above in Table 2. Therefore, the entire 4m-bit CMK defines m bit operations. As each bit operation has (2^4)=16 variants, there could be a total of $16^m = 2^{4m}$ variants. Thus, it would be extremely difficult if not impossible for anyone to ascertain, by any device or process, the result of the final mathematical operation, which is determined by the 4m-bit CMK. This is especially true if m is selected to be a large number. As stated above, the CMK that is generated as the verification key in the factory is randomly generated and is not saved in the host processor 10, but only in the firmware of the SP 20 and in the programming image of the CMLD 30, neither of which are readable. Therefore, the algorithm provides extremely robust security.

As the number of "1" bits is imbalanced in all of the 16 operations, e.g., if the 4-bit CMK value is 0 or 15, the result R may be all "0" bits or all "1" bits, as seen in Table 1. For CMK bits 1, 2, 4, 7, 8, 11, 13, 14, the number of "0" bits is either less than or greater than the number of "1" bits. This is because when the SP 20 randomly generates the CMK, some of the CMKs may not be suitable candidates. Therefore, the SP 20 preferably checks each randomly generated CMK and excludes it if it is not deemed to be a suitable candidate so that it is not sent to the CMLD 30. This is typically done in the factory. One method that may be used by the SP 20 to validate whether a randomly generated CMK is a suitable candidate will now be described. The invention, however, is not limited to this method of performing the validation. For example, similar methods that balance the number of "0" bits and "1" bits are also suitable for use with the invention.

A suitable CMK candidate is deemed to be one that causes the CMLD 30 to produce an output result R that has a balanced number of "0" bits and "1" bits. The SP 20 determines whether the randomly generated CMK will cause the result R output from the CMLD 30 to have a balanced number of "0" bits and "1" bits as follows:

(1) If either the number of 0x0 nibbles in the CMK and the number of 0xF nibbles in the CMK is greater than a certain number, e.g., 1, then the result R may have an imbalanced number of "0" bits and "1" bits. Therefore, the SP 20 determines whether the number of 0x0 nibbles in the CMK is greater than 1, and if so, replaces one of the 0x0 nibbles with a 0x6 nibble. Likewise, if the number of 0xF nibbles is greater than one, the SP 20 replaces the 0xF nibble with a 0x9 nibble. This is because nibbles 0x6 and 0x9 each have a balanced number of "0" and "1" bits;

(2) If the difference between the sum of CMK nibbles 1, 2, 4, 8 and the sum of CMK nibbles 7, 11, 13, 14 is greater than a certain number, e.g., 8, then the result R may have an imbalanced number of "0" bits and "1" bits. Therefore, the SP 20 determines whether the difference between the sums of these CMK nibbles is greater than the number, and if so, replaces one or more of CMK nibbles 1, 2, 4, 8 with a 0x5 nibble and/or replaces one or more of nibbles 7, 11, 13, 14 with a 0xA nibble. Nibbles 0x5 and 0xA each have a balanced number of "0" and "1" bits.

After excluding some unsuitable CMK values, the number of suitable CMK values should still be sufficiently large for the core algorithm to operate effectively to provide a high level of security. For example, even if only certain CMK nibbles, such as CMK nibbles 3, 5, 6, 9, 10, 12, for example, are balanced, this still provides $6^m > 2^{2.58m}$ combinations of CMK values. Therefore, there could be more than at least $2^{2.58m}$ variants of actual algorithms running in each of the logic cells of the CMLD 30, which would make it extremely difficult if not impossible for anyone to ascertain, by guessing or otherwise, the result R. Thus, the number of CMK values will be more than adequate as long as the value for m is chosen to be sufficiently large. In addition, because of the obfuscation of the verification key accomplished in the factory through personalization of the programming image, it would even be extremely difficult to hack the system 1 even if the would-be hacker knew the bit values for matrices A and B.

Figure 4:
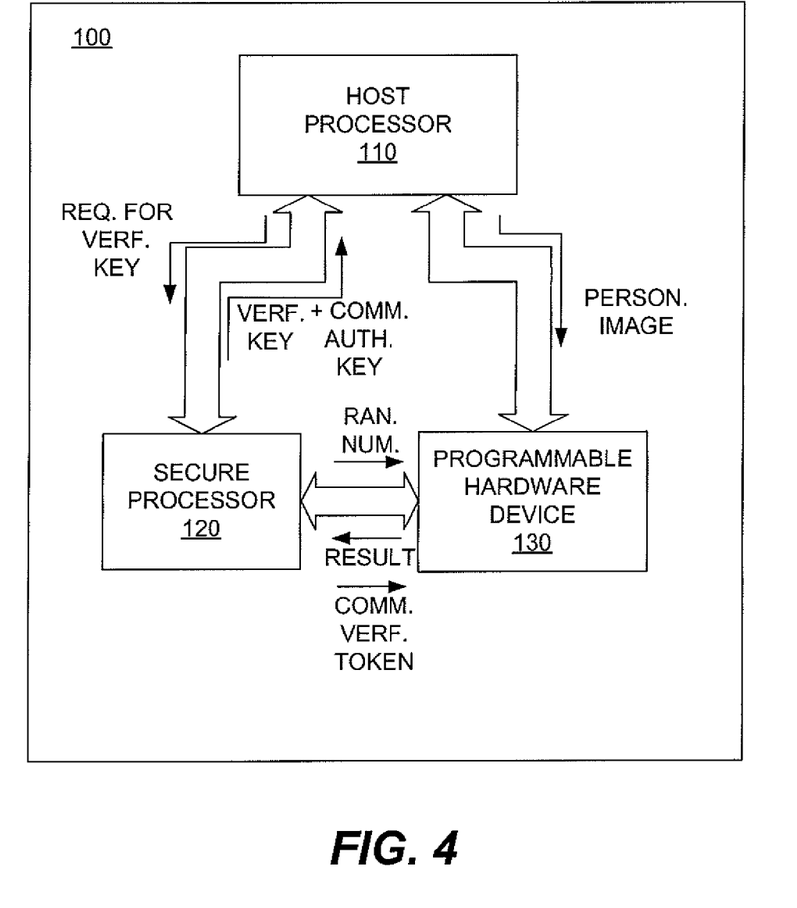
FIG. 4 illustrates a block diagram of the system in accordance with an alternative embodiment for authenticating a programmable hardware device, wherein the system includes a host processor, a secure processor (SP) and the programmable hardware device for authenticating a command received by the programmable hardware device.

Alternatively, embodiments can include systems that involve authenticating commands received by the programmable hardware device, to prevent digital logic circuits in the programmable hardware device from being altered by unauthorized parties, e.g., via unauthorized instructions or commands. FIG. 4 illustrates a block diagram of the system 100 in accordance with an alternative embodiment. The system 100 is similar to the system 1 in FIG. 1. The system 100 includes a host processor 110, a secure processor (SP) 120 and a programmable hardware device 130.

In the factory, prior to shipment to the customer, the host processor 110 and the SP 120 communicate messages between them during which the host processor 110 requests a verification key and a command authentication key from the SP 120. The host processor 110 executes special computer code during this time that will be deleted prior to shipping the system 100 to the customer. In response to the request for the verification key and the command authentication key, the SP 120 generates a first random number and a second random number that are output and sent to the host processor 110. The first random number serves as a verification key and the second random number serves as a command authentication key. The SP 120 stores these random numbers in a memory device located inside of the SP 120.

The host processor 110 receives the verification key and the command authentication key and uses them to modify, or personalize, a programming image that is to be used to program the CLPD 30. The host processor 110 then programs the CLPD 30 with the programming image. The host processor 110 does not retain a copy of the verification key or the command authentication key. By using the verification key and the command authentication key in the process of generating, or personalizing, the programming image, the verification key and the command authentication key essentially become "hidden" in the logical configuration of the CLPD 30. After this point in time, the verification key and the command authentication key will never be exchanged between any of the host processor 110, the SP 120 and/or the CLPD 130.

Figure 5:
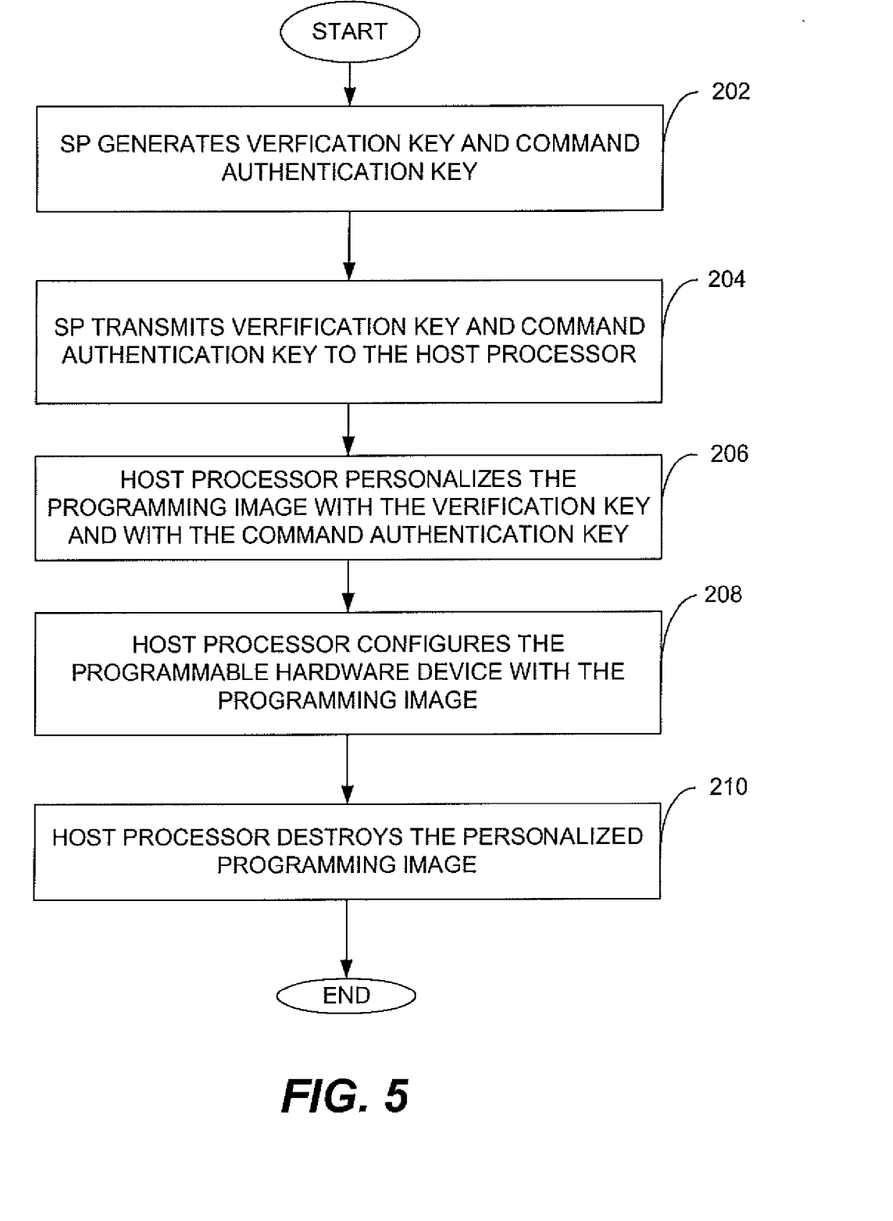
FIG. 5 illustrates a flowchart that represents a method performed by the system shown in FIG. 4 to personalize a programming image with a randomly generated verification key and a command verification token, and to configure the programmable hardware device shown in FIG. 4 with the personalized programming image.

Referring now to FIG. 5, with continuing reference to FIG. 4, shown is a block diagram of a first stage of a method for authenticating a command received by the programmable hardware chip. The first stage is similar to the method shown in FIG. 2, except that additionally a command authentication key is generated by the secure processor 120, transferred to the host processor 110 and ultimately hidden in the logical configuration of the CLPD 130.

The first stage involves the exchange of certain keys among various components within the system 100, while the system 100 is being personalized within the factory. The first stage includes a step 202 of the secure processor 120 generating a random verification key and, alternatively, also a random command authentication key. As discussed hereinabove, the secure processor 120 is configured to be able to generate such keys. The secure processor 120 stores a copy of each key within the persistent memory of the secure processor 120. The first stage includes a step 204 of the secure processor 120 transmitting the verification key and the command authentication key to the host processor 110.

The first stage includes a step 206 of the host processor 110 embedding the verification key and the command authentication key into a personalized programming image for the programmable hardware device 130. That is, once the host processor 110 has received the verification key and the command authentication key from the secure processor 120, the host processor 110 adds the verification key and the command authentication key to the image for the programmable hardware device 130.

The first stage includes a step 208 of the host processor 110 programming the image into the programmable hardware device 130. Since the host processor 110 included the verification key and the command authentication key in the image that the host processor 110 programs for the programmable hardware device 130, the programmable hardware device 130 is able to store or hide the verification key and the command authentication key within the logical configuration of the programmable hardware device 130.

The first stage includes a step 210 of the host processor 110 destroying or removing the image. Once the host processor 110 programs the image (with the verification key and the command authentication key) to the programmable hardware device 130, the host processor 110 destroys the image that is stored in the host processor 110. In this manner, the host processor 110 no longer contains the verification key or the command authentication key.

As a result of the first stage of the method for authenticating a programmable hardware chip, the programmable hardware device 130 and the secure processor 120 share two keys: the verification key and the command authentication key. That is, the verification key stored in the secure processor 120 is the same verification key embedded in the program logic of the programmable hardware device 130, and the command authentication key stored in the secure processor 120 is the same command authentication key embedded in the program logic of the programmable hardware device 130. Since the image cannot be read from the programmable hardware device 130 chip and the secure processor 120 can not send out the verification key or the command authentication key, the secure processor 120 and the programmable hardware device 130, which are on the same product unit, i.e., the system 100, now are the only parties who own these two keys.

Figure 6:
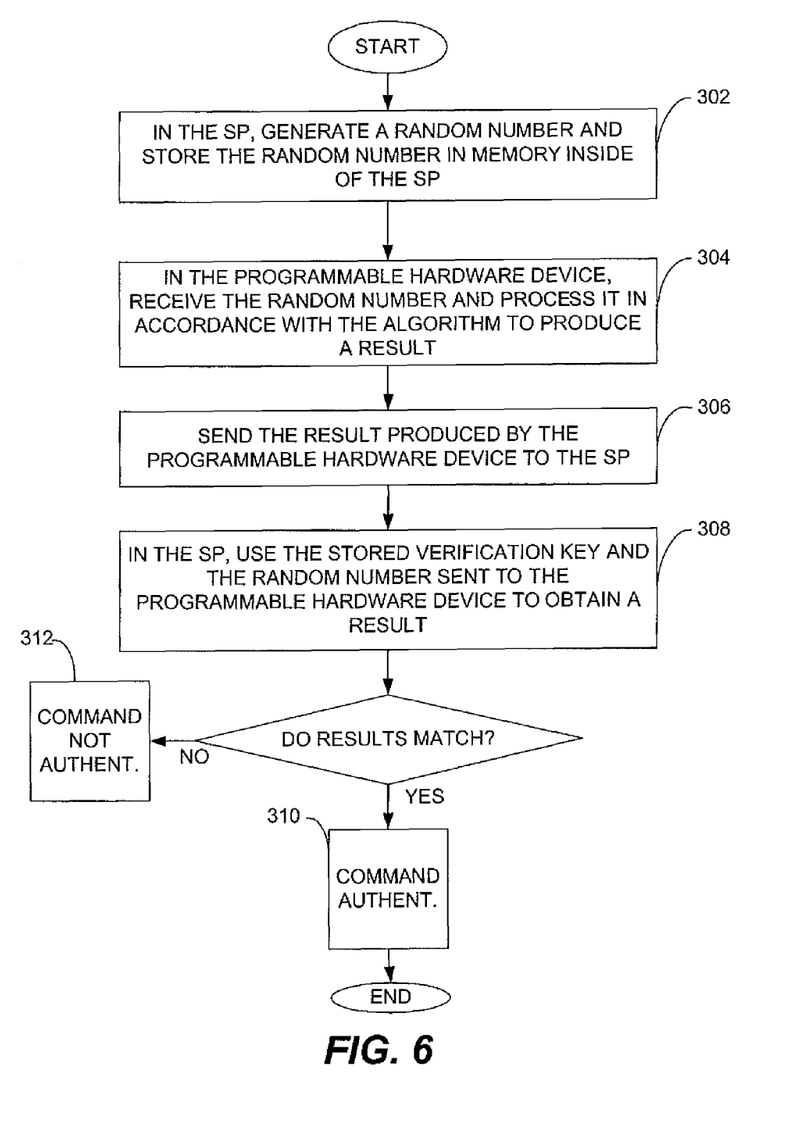
FIG. 6 illustrates a flowchart that represents a method performed by the system shown in FIG. 4 after the method represented by the flowchart shown in FIG. 5 has been performed to authenticate a command received by the programmable hardware device.

Referring now to FIG. 6, with continuing reference to FIG. 4, shown is a block diagram of a second stage of a method for authenticating a command received by the programmable hardware chip. The second stage typically occurs once the programmable hardware device has been authenticated using the verification key, as described hereinabove and shown in FIG. 2.

Referring now to FIG. 6, shown is a block diagram of a second stage of a method for authenticating a command received by the programmable hardware chip. The second stage includes a step 302 of the secure processor 120 generating a command verification token. The secure processor 120 uses the authenticated data sample result, e.g., the encrypted data sample resulting from the step 71 (FIG. 3), as an input to generate the command verification token. For example, if the secure processor 120 includes a random number generator to provide the initial data sample, the secure processor 120 can use the encrypted data sample (i.e., the data sample result) as an input to the data sample generator to generate the command verification token. The secure processor 120 also uses the verification key and the command authentication key as input variables into the data sample generator to generate the command verification token.

The second stage includes a step 304 of the secure processor 120 transmitting the command verification token to the programmable hardware device 130. The transmission of the command verification token from the secure processor 120 to the programmable hardware device 130 is shown generally in FIG. 4 as the "COMM VERIF. TOKEN" data flow from the secure processor 120 to the programmable hardware device 130.

It should be noted that data exchanges between the secure processor 120 and the programmable hardware device 130 typically are protected. Commands from the secure processor 120 usually are initiated by developers, rather than end users. Developers typically have greater access privileges than end users, therefore, data such as command verification tokens usually are not transmitted from the secure processor 120 without proper proof of developer privileges. Such privileges can be verified in any suitable manner, e.g., by presenting an appropriate access token to the secure processor 120.

The second stage includes a step 306 of the programmable hardware device 130 generating a command verification result. To generate the command verification result, the programmable hardware device 130 uses the initial random number data sample result previously saved by the programmable hardware device 130, i.e., from the step 67 (FIG. 3), as described hereinabove. The programmable hardware device 130 also uses the verification key and the command authentication key embedded therein to generate the command verification result. As discussed hereinabove, both the verification key and the command authentication key were delivered to the programmable hardware device 130 and embedded therein during the step 55 (FIG. 2) of the authentication method. Therefore, the programmable hardware device 130 uses the same inputs to generate the command verification result as the secure processor 120 used to generate the command verification token.

The second stage includes a step 308 of the programmable hardware device 130 comparing the command verification result generated by the programmable hardware device 130 to the command verification token received from the secure processor 120. Since the command verification result and the command verification token both were generated using the same data sample result, as well as the same verification key and command authentication key, the command verification result and the command verification token should match. If there is no difference between the command verification result and the command verification token, then the programmable hardware device 130 has authenticated the command verification token sent from the secure processor 120. Consequently, the programmable hardware device 130 will start a sequence of pre-defined actions, which should be triggered by the authenticated command verification token. However, if the command verification result and the command verification token are different, then the command authentication has failed. Such failed authentication is shown generally as a command not authenticated 312. As discussed hereinabove, the programmable hardware device 130 typically does not execute any command that is not authenticated.

As indicated above, the algorithms described above that are performed by the host processor 10 and the SP 20 are typically performed in software and/or firmware. It should be noted, however, that these algorithms may instead be performed solely in hardware or in a combination of hardware and software and/or firmware. The host processor 10 and the SP 20 typically each include one or more on-board memory elements that are integrated together with the corresponding CPUs in the IC packages. Such memory elements include, for example, a RAM element, an EEPROM element, a flash memory element, a read only memory (ROM) element, etc. The software and/or firmware needed to perform the corresponding algorithms will typically be stored in one or more of these memory elements, which constitute computer-readable mediums. In addition, the system 1 may include, or have access to, one or more external memory devices that are used for storing software and/or firmware corresponding to the algorithms executed by the CPUs of the host processor 10 and SP 20. Such other memory devices may include, for example, magnetic tape or disks as will as optical recording devices, such as optical disks. It will be apparent to those skilled in the art that many changes and substitutions can be made to the programmable hardware chip authenticating methods, devices and systems herein described without departing from the spirit and scope of the invention as defined by the appended claims and their full scope of equivalents.

The invention claimed is:

1. A communication device, comprising:
a programmable hardware chip having a verification key embedded therein, wherein the programmable hardware chip is configured to process a random number received thereby using the verification key embedded therein to generate a first result; and
a secure processor coupled to the programmable hardware chip and having stored therein the same verification key embedded in the programmable hardware chip, wherein the secure processor is configured to process the random number generated thereby using the verification key stored therein to generate a second result,
wherein the secure processor is configured to compare the first result and the second result,
wherein, when the logic in the programmable hardware chip has not been modified since embedding the verification key therein and prior to the programmable hardware chip generating the first result, the first result will be the same as the second result and the programmable hardware chip is authenticated,
wherein, when the logic in the programmable hardware chip has been modified since embedding the verification key therein and prior to the programmable hardware chip generating the first result, the first result will not be the same as the second result and the programmable hardware chip is not authenticated, and
wherein the secure processor has a command authentication key stored therein,
wherein the programmable hardware chip has stored therein the command authentication key stored in the same processor,
wherein the secure processor is configured to generate a command verification token using the first result, the verification key stored therein and the command authentication key stored therein, and compare the command verification token to the command verification result,
wherein, when the command verification token matches the command verification result, the programmable hardware authenticates the command verification token and executes a command associated with the command authentication key and received by the programmable hardware chip, and
wherein, when the command verification token does not match the command verification result, the programmable hardware chip does not authenticate the command authentication key and does not execute the command associated with the command authentication key and received by the programmable hardware chip.

2. The device as recited in claim 1, wherein the secure processor is configured to generate the command authentication key and store the generated command authentication key therein.

3. The device as recited in claim 1, wherein the communication device further comprises a host processor coupled to the secure processor and coupled to the programmable hardware chip,
wherein the host processor is configured to receive the command authentication key from the secure processor, embed the command authentication key into an image, and program the image into the programmable hardware chip in such a way that the command authentication key is embedded in the programmable hardware chip, 4. The device as recited in claim 1, wherein the programmable hardware chip has a circuit, and wherein the host processor embeds the command authentication key into the programmable hardware chip by configuring the circuit of the programmable hardware chip into a specific logic circuit that executes functions specified by the command authentication key.

5. A method for authenticating a programmable hardware chip, wherein the programmable hardware chip has a verification key stored therein, comprising the steps of:
generating a random number by a secure processor, wherein the secure processor has stored therein the verification key stored in the programmable hardware chip;
transmitting by the secure processor a copy of a random number to the programmable hardware chip, wherein the programmable hardware chip is configured to process the random number received thereby using the verification key embedded therein to generate a first result;
receiving by the secure processor the first result from the programmable hardware chip;
processing by the secure processor the random number generated thereby using the verification key stored therein to generate a second result; and
comparing by the secure processor the second result generated by the secure processor and the first result received from the programmable hardware chip,
wherein, when the logic in the programmable hardware chip has not been modified since the verification key was stored therein and prior to the programmable hardware chip generating the first result, the first result will be the same as the second result and the programmable hardware chip is authenticated, and
wherein, when the logic in the programmable hardware chip has been modified since the verification key was stored therein and prior to the programmable hardware chip generating the first result, the first result will not be the same as the second result and the programmable hardware chip is not authenticated,
wherein the secure processor has a command authentication key stored therein, wherein the programmable hardware chip has stored therein the command authentication key stored in the secure processor, and wherein the method further comprises the steps of:
generating by the secure processor a command verification token using the second result, the verification key and the command authentication key;
transmitting by the secure processor the command verification token to the programmable hardware chip,
wherein the programmable hardware chip is configured to generate a command verification result using the first result, the verification key stored therein and the command authentication key stored therein,
wherein, when the command verification result is the same as the command verification token, the programmable hardware chip authenticates the command verification token and executes a command associated with the command authentication key and received by the programmable hardware chip, and
wherein, when the command verification result is not the same as the command verification token, the programmable hardware chip does not authenticate the command authentication key and does not execute the command associated with the command authentication key and received by the programmable hardware chip.

6. The method as recited in claim 5, wherein the method further comprises the steps of:
generating by the secure processor a command authentication key;
storing the command authentication key within the secure processor; and
transmitting the generated command authentication key to a host device configured to embed the command authentication key into an image and program the image into the programmable hardware chip in such a way that the command authentication key is embedded in the programmable hardware chip.

7. A non-transitory computer readable medium storing the instructions that, when executed on a programmed processor, carry out a method for authenticating a programmable hardware chip, wherein the programmable hardware chip has a verification key stored therein, comprising:
instructions for generating by the secure processor a copy of the random number to the programmable hardware chip, wherein the programmable hardware chip is configured to process the random number using the verification key stored therein to generate a first result;
instructions for receiving by the secure processor the first result from the programmable hardware chip;
instructions for processing by the secure processor the random number generated thereby using the verification key stored therein to generate a second result;
instructions for generating by the secure processor the verification key stored therein, and further comprising instructions for transmitting the generated verification key to a host device configured to embed the verification key into an image and program the image into the programmable hardware chip in such a way that the verification key is embedded in the programmable hardware chip; and
instructions for comparing by the secure processor the second result generated by the secure processor and the first result received from the programmable hardware chip,
wherein, when the logic in the programmable hardware chip has not been modified since the verification key was stored therein and prior to the programmable hardware chip generating the first result, the first result will be the same as the second result and the programmable hardware chip is authenticated, and
wherein, when the logic in the programmable hardware chip has been modified since the verification key was stored therein and prior to the programmable hardware chip generating the first result, the first result will not be the same as the second result and the programmable hardware chip is not authenticated,
wherein the secure processor has a command authentication key stored therein, wherein the programmable hardware chip has stored therein the command authentication key stored in the secure processor, further comprising:

instructions for generating by the secure processor a command verification token using the second result, the verification key and the command authentication key;

instructions for transmitting by the secure processor the command verification token to the programmable hardware chip, wherein the programmable hardware chip is configured to generate a command verification result using the first result, the verification key stored therein and the command authentication key stored therein, wherein the programmable hardware chip is configured to compare the command verification token and the command verification result, wherein, when the command verification result is the same as the command verification token, the programmable hardware chip authenticates the command verification token and executes a command associated with the command authentication key and received by the programmable hardware chip, and wherein, when the command verification result is not the same as the command verification token, the programmable hardware chip does not authenticate the command authentication key and does not execute a command associated with the command authentication key and received by the programmable hardware chip.

8. The computer readable medium as recited in claim 7, further comprising:

instructions for generating by the secure processor a command authentication key;

instructions for storing the command authentication key within the secure processor;

instructions for transmitting the generated command authentication key to a host device configured to embed the command authentication key into an image and program the image into the programmable hardware chip in such a way that the command authentication key is embedded in the programmable hardware chip.

* * * * *